(12) United States Patent
DeFlumere et al.

(10) Patent No.: US 6,877,691 B2
(45) Date of Patent: Apr. 12, 2005

(54) HIGH ALTITUDE STRIPPING FOR THREAT DISCRIMINATION

(75) Inventors: Michael E. DeFlumere, Winchester, MA (US); Michael P. Bulpett, Woburn, MA (US); Timothy J. Boyd, Winchester, MA (US); Kurt J. Nordhaus, Pepperell, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/334,884

(22) Filed: Dec. 31, 2002

(65) Prior Publication Data

US 2004/0004155 A1 Jan. 8, 2004

Related U.S. Application Data

(60) Provisional application No. 60/363,659, filed on Mar. 12, 2002.

(51) Int. Cl.[7] ........................... F42B 15/01; F42B 15/10
(52) U.S. Cl. ....................... 244/3.16; 244/3.1; 244/3.11; 244/3.15; 89/1.11; 342/52; 342/53; 342/54; 342/61; 342/62
(58) Field of Search ..................... 89/1.11; 244/3.1–3.3; 356/3, 3.01–5.15; 342/13, 27, 28, 52–59, 61, 62, 89, 90, 175, 192–197

(56) References Cited

U.S. PATENT DOCUMENTS

| | | | |
|---|---|---|---|
| 3,944,167 A | * | 3/1976 | Figler et al. ............... 244/3.16 |
| 3,982,713 A | | 9/1976 | Martin |
| 4,308,538 A | | 12/1981 | Albersheim |
| 4,471,358 A | | 9/1984 | Glasser |
| 5,082,211 A | | 1/1992 | Werka |
| 5,340,056 A | | 8/1994 | Guelman |
| 5,345,304 A | | 9/1994 | Allen |
| 5,501,413 A | * | 3/1996 | Kilger et al. ............... 244/3.15 |
| 5,611,502 A | | 3/1997 | Edlin |
| 5,806,801 A | | 9/1998 | Steffy |
| 6,042,050 A | | 3/2000 | Sims |
| 6,082,666 A | | 7/2000 | Windhorst |
| 6,087,974 A | * | 7/2000 | Yu ............................. 342/62 |
| 6,243,037 B1 | | 6/2001 | Pulford |
| 6,323,941 B1 | | 11/2001 | Evans |
| 6,356,231 B1 | * | 3/2002 | Zheng et al. ............... 342/195 |

OTHER PUBLICATIONS

PCT International Search Report dated Oct. 6, 2004 of International Application No. PCT/US03/40445 filed Dec. 17, 2003.

* cited by examiner

*Primary Examiner*—Bernarr Earl Gregory
(74) *Attorney, Agent, or Firm*—Daniel J. Long; Robert K. Tendler

(57) ABSTRACT

A technique is provided that uses a dual mode seeker (IR and LADAR) for precise target dynamics measurement, which extends stripping to a much higher altitude than ground based radar. Initial results show that this approach works to altitudes in excess of 100 km. Stripping becomes a reliable way to discriminate lighter weight decoys from reentry vehicles at altitudes and ranges consistent with planned divert capabilities for terminal phase missile defense. It is a finding of this invention that the LADAR will improve the spatial resolution by a factor of five over typical missile defense IR seekers using a common aperture. The LADAR provides a 3D angle, angle, range (AAR) image for each laser pulse which is used to extract the precise target state vectors.

11 Claims, 8 Drawing Sheets

HIGH ALTITUDE STRIPPING FOR THREAT DISCRIMINATION

CROSS REFERENCE TO RELATED APPLICATION

This application claims rights under U.S. Provisional Application Ser. No. 60/363,659; filed: Mar. 12, 2002.

FIELD OF INVENTION

The present invention relates to missile interceptors and more particularly to means for discriminating between threats and decoys.

BACKGROUND OF THE INVENTION

One of the most difficult technical challenges for Hit-to-Kill Missile Defense Systems is target discrimination. Nations that have a technology base to produce missiles and warheads will be capable of some level of countermeasures. Also launch and deployment debris contribute many objects to the threat cloud.

In current missile defense systems the bulk of this discrimination task falls on surface based radar supported by overhead assets. The primary radar discrimination methods are dependent on object trajectory and dynamics. The addition of an angle, angle, range (AAR) laser radar or LADAR to an IR seeker brings a number of possibilities for discrimination, robust tracking in the presence of countermeasures and clutter, accurate aim point selection and others including the use of high resolution tracks of unresolved objects to increase the probability of correct discrimination. To accomplish this one needs to be able to resolve closely spaced objects. To do this one needs to obtain precise target dynamics to be able to separate a remote reentry vehicle from chaff or other counter measures it deploys. This is accomplished through a technique known as stripping in which characteristics of all of the targets are measured and analyzed.

Stripping relies on atmospheric drag to separate objects based on their ballistic coefficient $\beta = M/C_d A$ where M is the object mass, $C_d$ is the coefficient of drag and A is the object area. Typical decoys are only a few percent of the RV mass and their area is by design a match, or more likely a distribution about the reentry vehicle (RV) area. Surface based radars use stripping, trajectory and object dynamics (spin and precession) to discriminate the threat. Due to the coarseness of radar measurements a significant atmospheric drag is required (50 to 70 km altitude) to produce a measurable amount of relative velocity or separation. The density of objects and the deployment of chaff complicates or delays extraction of target dynamics and subsequent discrimination. Also the measurement accuracy of the radar is dependent on the signal-to-noise ratio (SNR), which can contribute to late discrimination. Early discrimination is desirable for the following reasons: appropriate interceptor commitment to threat load, increased range of destroyed warhead from defended assets, and enabling a shoot-look-shoot engagement. While surface radars can be used for stripping, their use for targets at extreme high altitudes would have seemed to be of limited value due to the thinness of atmosphere at these altitudes.

By way of further background, automatic target recognition is described by Sims et al. in U.S. Pat. No. 6,042,050 in which passive infrared imagery is utilized in combination with LADAR.

While this Sims et al. patent describes the use of IR and laser range finding capabilities, no stripping is indicated for high altitude targets. Nor is a combined infrared sensor and LADAR range sensor provided with one sensor boresighted on the other. In fact the LADAR in the Sims et al. patent is used to differentiate terrestrial man made targets such as tanks from natural background and does not address the problem of discrimination against highflying decoys deployed by reentry vehicles. Other U.S. Patents such as U.S. Pat. No. 6,323,941; and U.S. Pat. No. 5,345,304 describe multi-mode sensors for both LADAR and IR.

U.S. Pat. Nos. 6,082,666; 3,982,713; and 5,611,502 describe missile defense systems, whereas U.S. Pat. No. 4,471,358 describes the use of chaff for protecting a ballistic missile from detection Other U.S. Patents relating to tracking and decoy resolution are U.S. Pat. Nos. 4,308,538; 5,340,056; 5,082,211; and 5,806,801.

SUMMARY OF THE INVENTION

The present invention is a method of discriminating between threat objects and decoy objects at high altitudes where it was thought stripping would be to no avail. Stripping is in fact made possible by providing a dual mode IR and LADAR seeker on a kill vehicle which analyses various target characteristics when the kill vehicle is within range. On board computers use these characteristics to discriminate a threat target from decoys and direct the kill vehicle to the target. First a dual mode IR and LADAR seeker is used to obtain precise target dynamic measurements of the objects. Atmospheric drag is then determined from these measurements to separate the objects into threat objects and decoy objects. After this determination, the track to the threat object is calculated and the kill vehicle is directed to intercept the identified threat. The subject system permits primary target complex acquisition and tracking using a two color cryo-cooled passive IR/direct-detect LADAR dual-mode seeker which is deployed after launch and enables target filtering to reduce the number of credible threats. Target cloud acquisition is at 1,000 km, with target acquisition at 500 km and LADAR acquisition at 350 km in one embodiment. Fast scan technology is used along with a common aperture design for the IR and LADAR sensors. The result is improved separation of closely spaced objects and the support of multi-color IR threat classification to improve kill ratios.

In summary, Nations of Concern will evolve robust countermeasures and tactics in an effort to defeat Missile Defense (MD) systems. This coupled with a cluttered battle space which includes booster debris, previous intercepts and raid attacks, results in a situation in which there are numerous closely spaced objects, CSOs. Incorrect target discrimination, during these stressing conditions, will substantially reduce the lethality of hit-to-kill defensive weapon systems. In the subject invention a technique is identified that uses a dual mode seeker involving both IR and LADAR detection systems for precise target dynamics measurement, which extends stripping to a much higher altitude than ground based radar. Initial results show that this approach works to altitudes in excess of 100 km. Stripping becomes a reliable way to discriminate lighter weight decoys from reentry vehicles at altitudes and ranges consistent with planned divert capabilities for terminal phase missile defense. Also presented are the results of a physics based model used to examine and quantify performance and establish the requirements for the LADAR. Typical engagement scenarios and timelines are used to evaluate this technique and demonstrate its practicality. Details of the LADAR design and integration into a missile defense seeker are presented.

Note that the LADAR improves the spatial resolution by a factor of 5 over a typical missile defense MWIR seeker using a common aperture. The LADAR also provides a 3D angle, angle, range (AAR) image for each laser pulse which is used to extract the precise target state vectors.

BRIEF DESCRIPTION OF THE DRAWINGS

These and other features of the subject invention will be better understood in conjunction with the Detailed Description in connection with the Drawings, of which.

DETAILED DESCRIPTION

Figure 1:
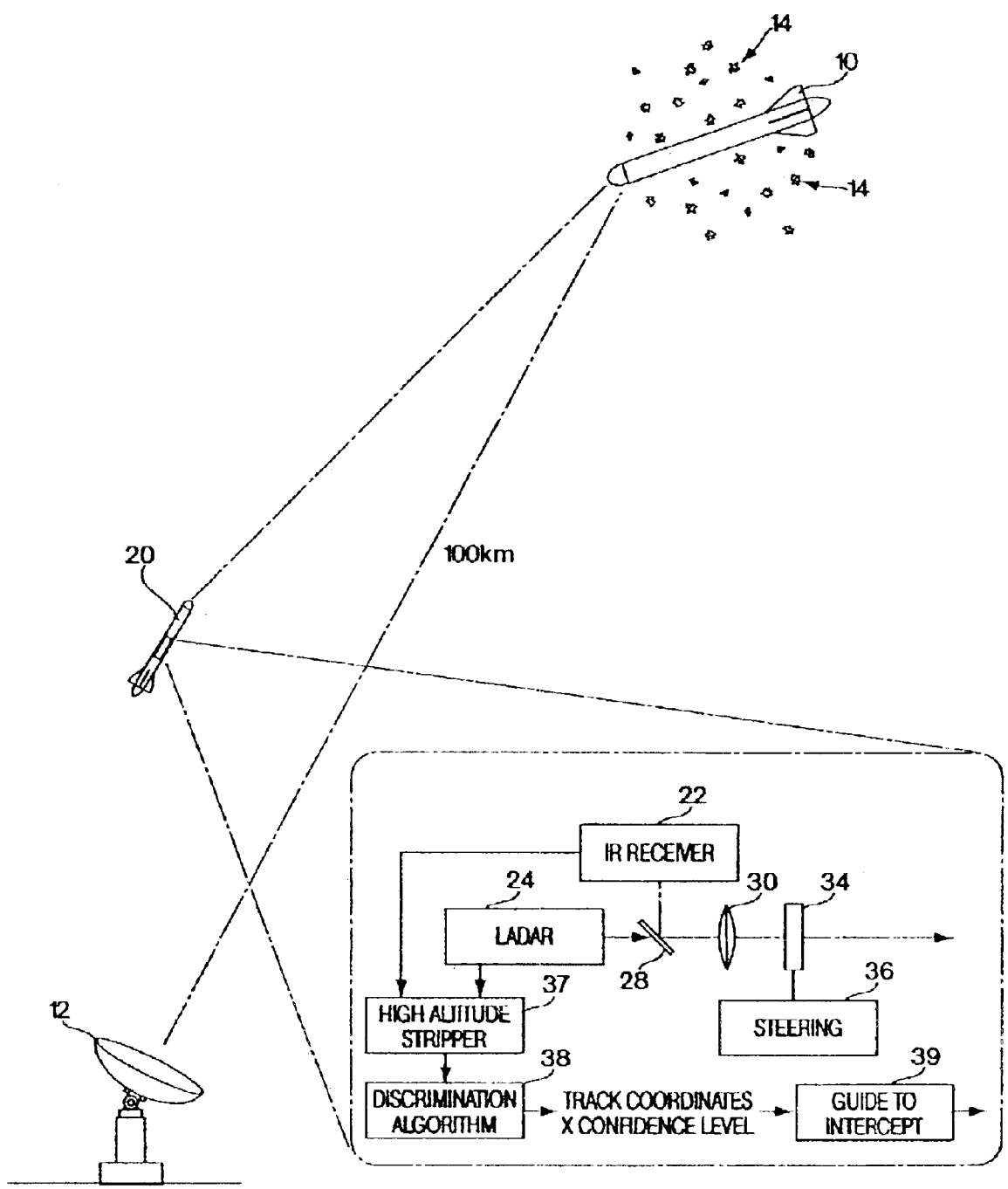
FIG. 1 is a diagrammatic illustration of a tactical situation of an incoming reentry vehicle to be hit by a kill vehicle in which the kill vehicle is provided with a dual mode seeker and stripping algorithms to discriminate against decoys.

Referring now to FIG. 1, in a tactical situation a reentry vehicle 10 is detected by ground based radar 12 which provides an initial track for the reentry vehicle along with decoys 14 which may include spherical or conical decoys or chaff used to confuse a kill vehicle 20 which is launched upon detection of the reentry vehicle.

On board reentry vehicle 20 is a dual-mode detector which includes an IR receiver 22 and LADAR unit 24 with the receiver and the LADAR unit having a common optical axis 26 including beam splitter means 28 optics 30, a steering mirror 34 and a steering control unit 36.

The output of the IR receiver and the LADAR unit are coupled to a high altitude stripper 37 which is in turn coupled to a discrimination algorithm 38 for outputting the track coordinates along with a confidence level for all the objects detected by the IR receiver and the LADAR system. The track coordinates along with the confidence level are utilized by an intercept computer 39 to guide the kill vehicle to intercept the true threat target.

It will be appreciated that the dual-mode seeker comes into play somewhere between 500 and 1,000 kilometers of the threat cloud which includes the threat vehicle 10 and decoys 14. The purpose of the high altitude stripper, discrimination algorithm and the intercept computer is to take into account the trajectory of the threat cloud, the precision rates of each of the individual targets in the threat cloud as well as their spin to be able to separate out the reentry vehicle from other objects such as decoys. In order to do this one needs to be able discriminate between targets which are removed from one another by as little as five meters. This discrimination is accomplished through the utilization of the LADAR in combination with the IR seeker and attendant algorithms, with the LADAR beam being swept along with the axis of the IR receiver by mirror 34 such that both sensors are co-boresighted.

When a common focal plane multi-mode detector is utilized, individual pixels for both the IR detection and the laser pulse detection are co-located. In one embodiment, the LADAR detection is activated through the boosting of the gain of the focal plane array pixels during LADAR pulse detection The gain may be increased during the expected receipt of returned laser pulses by a factor of 30 through biasing circuits within the array.

It is the finding of this invention that characteristics of dynamic flight due to atmospheric drag can in fact be sensed at high altitudes, and more in particularly by sensors on the kill vehicle so that due to mass, rotational frequency and precession, a threat vehicle may be distinguished from decoys or other objects which are following the same trajectory as the threat vehicle.

How this is accomplished is now described:

1.0 Phenomenology and Exploitation

Figure 2:
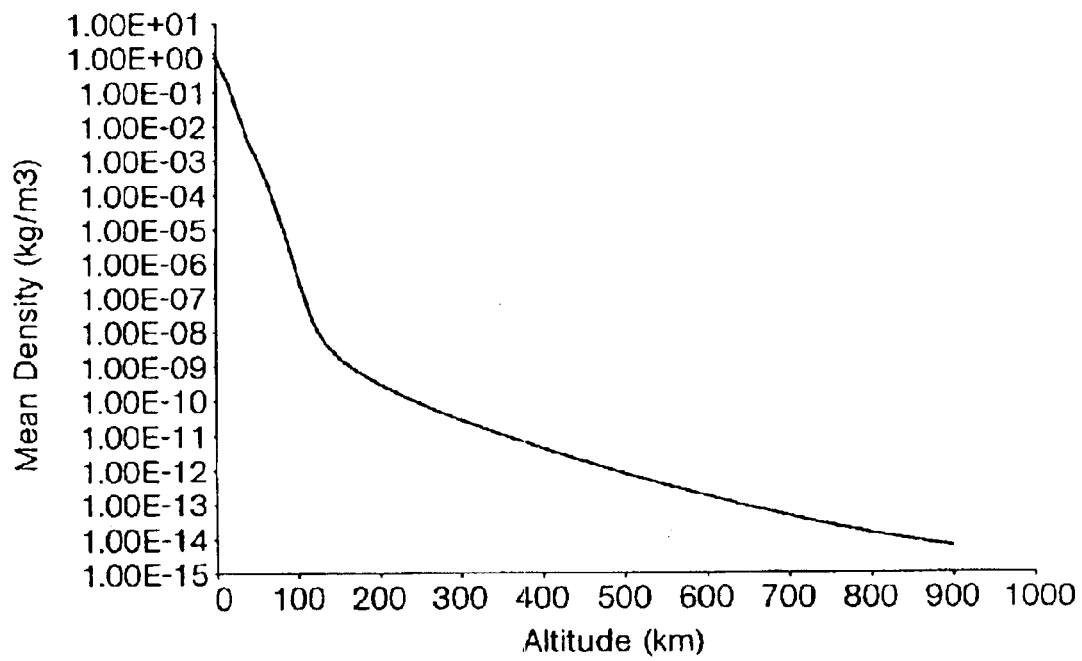
FIG. 2 is a graph showing density estimation from the MSISE-90 model.

Since stripping is dependant on atmospheric density it has not been considered at altitudes that are characterized as exoatmospheric (>100 km). Modeling of the thermosphere (>90 km) has been evolving for about 35 years. The current models in use by the scientific community use diffusion analysis and measurements using satellites and radar data to generate density profiles. The most recent of these models, the Mass Spectrometer and Incoherent Scatter or MSISE-90 model, extended to ground level, was used and its results are shown for an average case in FIG. 2. The program produces an altitude table of temperature and number densities for the major atmospheric constituents ($N_2$, $O_2$, Ar, N, O, He, H) and total mass density for selected time and earth location The model also uses a database of solar activity to account for the varying solar radiation into the system. Notice that the density decreases less than would be expected from an extrapolation of low altitude models such as LOWTRAN.

Exploitation of this phenomenology sets two conditions: the need for precision 3D tracking and sufficient time for decoy and threat separation. These conditions are related to the LADAR performance not only in its tracking precision but also in the sensitivity or detection range of the LADAR. Details of the LADAR approach are given in Section 3.0 below.

2.0 Analysis, Modeling, and Results

Figure 3:
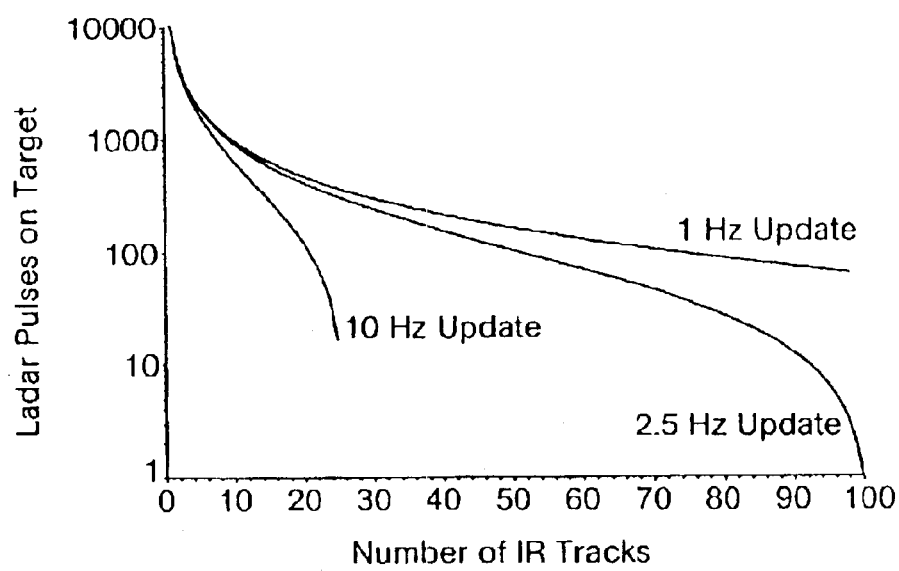
FIG. 3 is a graph showing a track update for a 10 KHz LADAR.

Searching the threat cloud starts with surface based radar. Here potentially 1000's of objects are reduced to 10's or 100's of objects of interest. The battle management system determines the launch location, time and intercept trajectory to optimize the probability of kill with knowledge of the interceptor's discrimination capabilities. This enables an early intercept to support a shoot-look-shoot scenario. The kill vehicle processor is used to correlate the uploaded radar tracks with the IR tracks. It is assumed that at long detection ranges the complete threat cloud is within the field of view (FOV) of the IR seeker. This would require the IR seeker to have a field of view of about three degrees to view a 5 km cloud at 100 km. It is reasonable to expect the fusion of radar and IR to reduce the number of unknown objects or clusters to less than 100. A scan mirror is used to point the laser at each of these unknown objects, as cued by the IR. This will allow 4 ms for mirror slew and settle time and 60 laser pulses on target for a 10 kHz LADAR PRF. The LADAR may initiate more than one track for each IR track, since it provides line of sight, LOS, range information and has higher angular resolution than the IR seeker. A 1 Hz update rate is provided for 100 IR tracks. If more than 100 IR tracks are present, then the fused IR radar data prioritization is used to select the 100 with the highest probability to be the threat. For engagements with fewer IR tracks the update rate can be increased as shown in FIG. 3. The allocation of LADAR pulses is controlled by the track processor to best match the resource to the discrimination problem.

Figure 4:
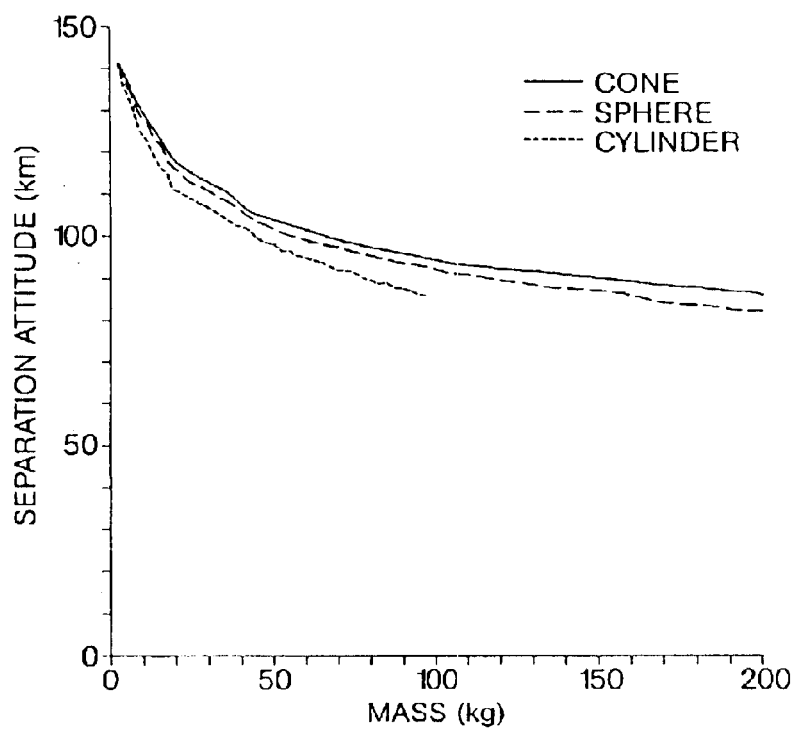
FIG. 4 is a graph showing model results for 5 meter separation.
Figure 5:
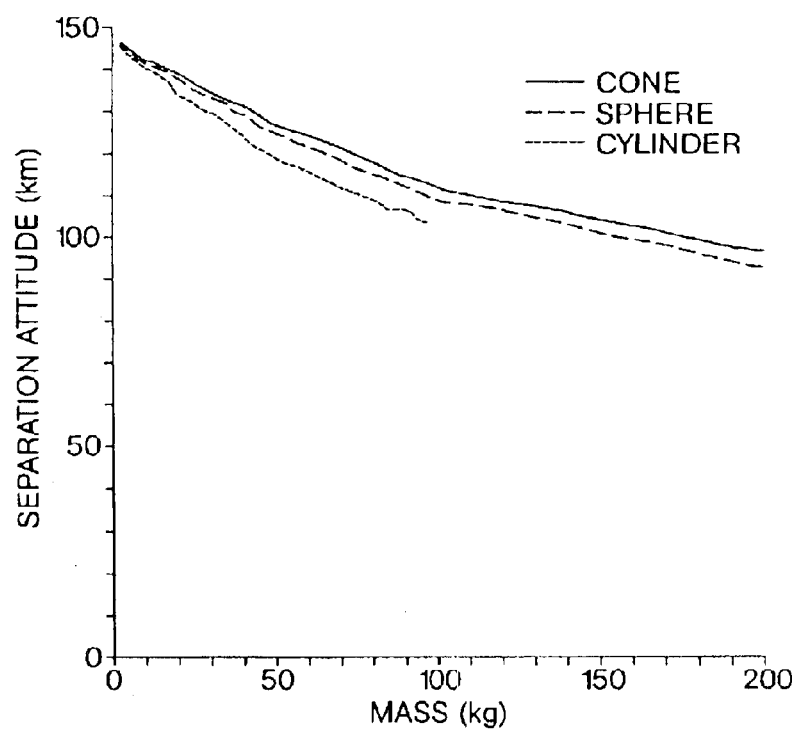
FIG. 5 is a graph showing model results for 1 meter separation.

A physics based model was developed to analyze and quantify the separation of threats and decoys for several representative cases. Results for cone, sphere and cylinder decoys of various masses are shown in FIG. 4, where the mass of the threat used is 200 kg. The objects are deployed at an apogee of 147 km with no relative velocity and no separation. The plots show the altitude at which a five meter separation is achieved. Typical decoys range from a few percent to at most 10% of the threat mass. For a 20 kg sphere, the model predicts a five meter separation at 115 km altitude which is 87 seconds after apogee. For a 2 kg sphere the separation will occur at 142 km or 33 seconds after apogee. FIG. 3 shows the results for a one meter separation. For a 2 kg sphere the separation will occur at 146 km or 15 seconds after apogee.

The LADAR range resolution accuracy is 6 cm. Therefore the measurement of one meter range separation is not difficult for the special case when the decoys and RV are measured in the same laser pulse. The problem is much more difficult when the objects are spaced by more than the laser beam width of 150 microradians. In this case the measurements are made at different times since the beam must be repositioned on each object. The accuracy of the measurement will now be driven by the how well the change in kill vehicle position is known. Results show that 1 to 5 meter of separation is required to reliably find the reentry vehicle.

3.0 Dual Mode Seeker Implementation

Figure 6:
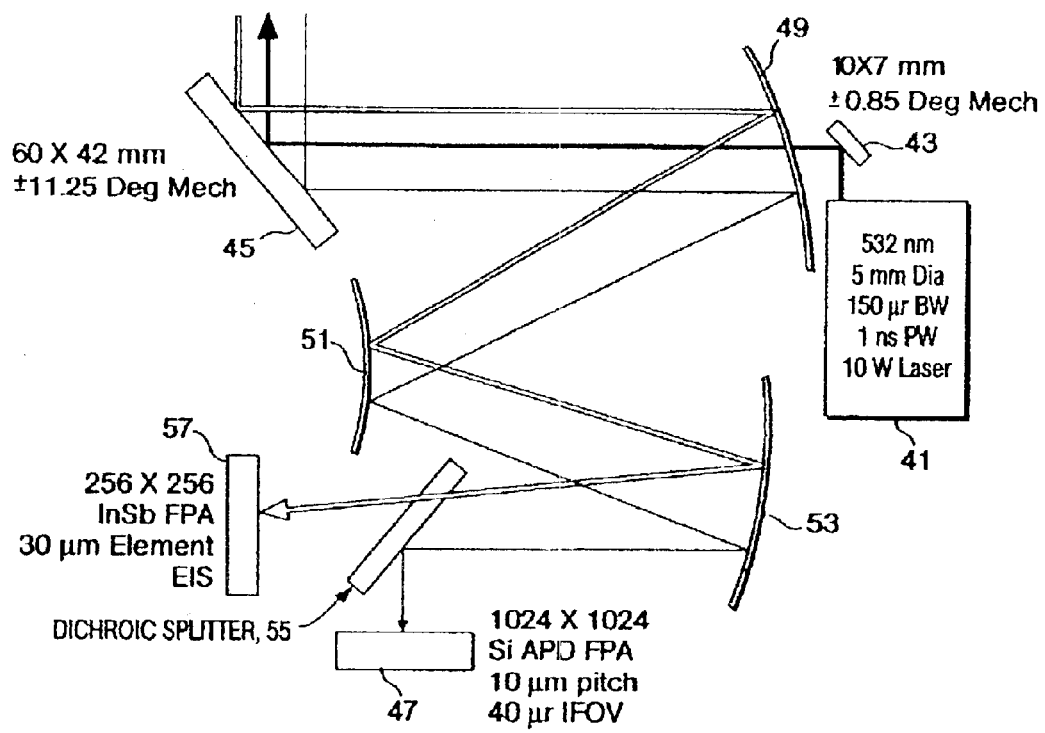
FIG. 6 is a schematic diagram of a preferred embodiment of the integrated LADAR and MWIR seeker of the present invention.

Of the many and varied laser radar systems available, a flash LADAR with a photon counting receiver array was selected. This was driven primarily by the small size of the current seekers and the desire to have lighter and more maneuverable kill vehicles for terminal phase systems in the future, thereby requiring reductions in volume for the seeker. For interceptors with larger kill vehicles other types of LADAR such as range resolved Doppler may be the better trade. The integration of the LADAR into a seeker is shown in FIG. 6. Here a LADAR laser 41 has a beam directed by a mirror 43 to a two axis scan mirror 45. In this embodiment, a focal plane array 47 detects returned laser pulses which are collected using optics 49, 51 and 53, along with dichroic splitter 55. Received infrared energy is directed to a second focal plane array 57 by optics 41, 51 and 53 after having been steered by mirror 45 and having passed through dichroic splitter 55.

Figure 7:
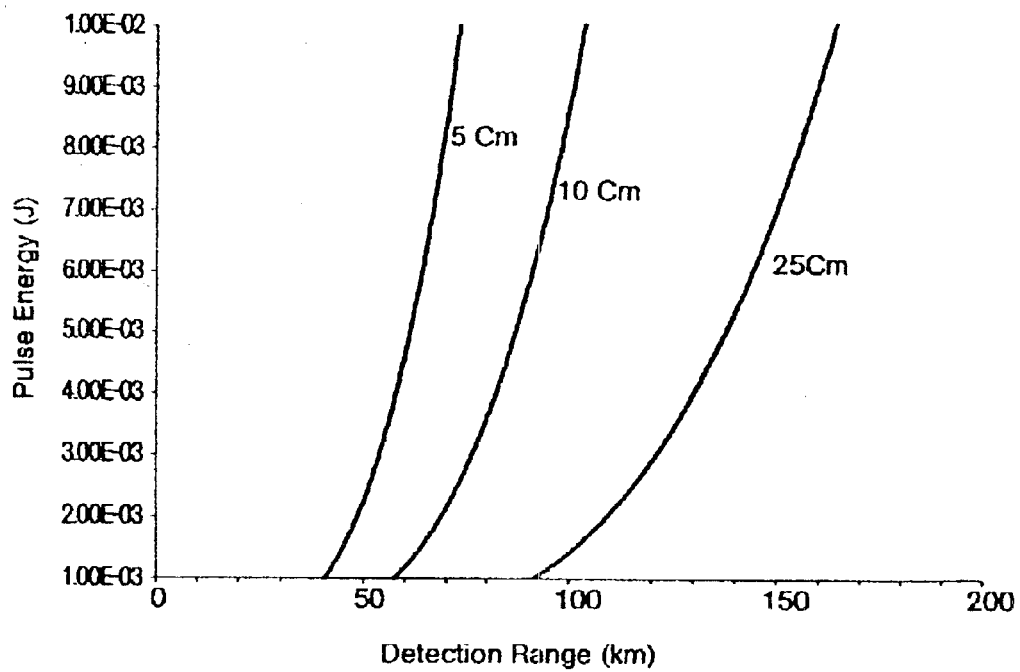
FIG. 7 is a predicted LADAR performance in the method of the present invention.

Stabilization and pointing of both the LADAR and MWIR is accomplished by two axis scan mirror 45. The large mirror (lower bandwidth) positions both the MWIR and LADAR focal point arrays to the region of interest, selected by the surface based radar. The LADAR receiver uses a large array 47 of silicon avalanche photodetectors that have the same field of view as the IR focal point array 57. Selection of the 532 nm wavelength was made to maximize the resolution for available apertures. If a compromise can be made on resolution or a large aperture is available, then 1.06 $\mu$m would improve system performance by 2× for a photon counting system. This assumes that the dark count for a device optimized for 1.06 $\mu$m is not increased. This occurs because the improved laser conversion efficiency is about offset by the avalanche photodetector QE decrease. The 2× result is because there are twice as many photons generated per joule of laser energy. Also for interceptors that operate in the upper atmosphere, transmission and solar background favor operation at 1.06 $\mu$m rather than 532 nm. The optical system including the window would be easier and/or lower cost to design and fabricate since this would be closer to the IR band on the seeker. Performance estimates for three collecting apertures is shown in FIG. 7, for the parameters shown below in Table 1.

TABLE 1

| LADAR Model Parameters |
| --- |
| 532 nm Laser |
| 150 $\mu$r Divergence |
| Silicon APD |
| Single Photon Detection |
| 70% QE |
| 80% Optical Transmission |
| 70% Filter Transmission |
| 1 m$^2$ Target Area |
| 10% Target Reflectivity |
| Exo-atmospheric |

Figure 8:
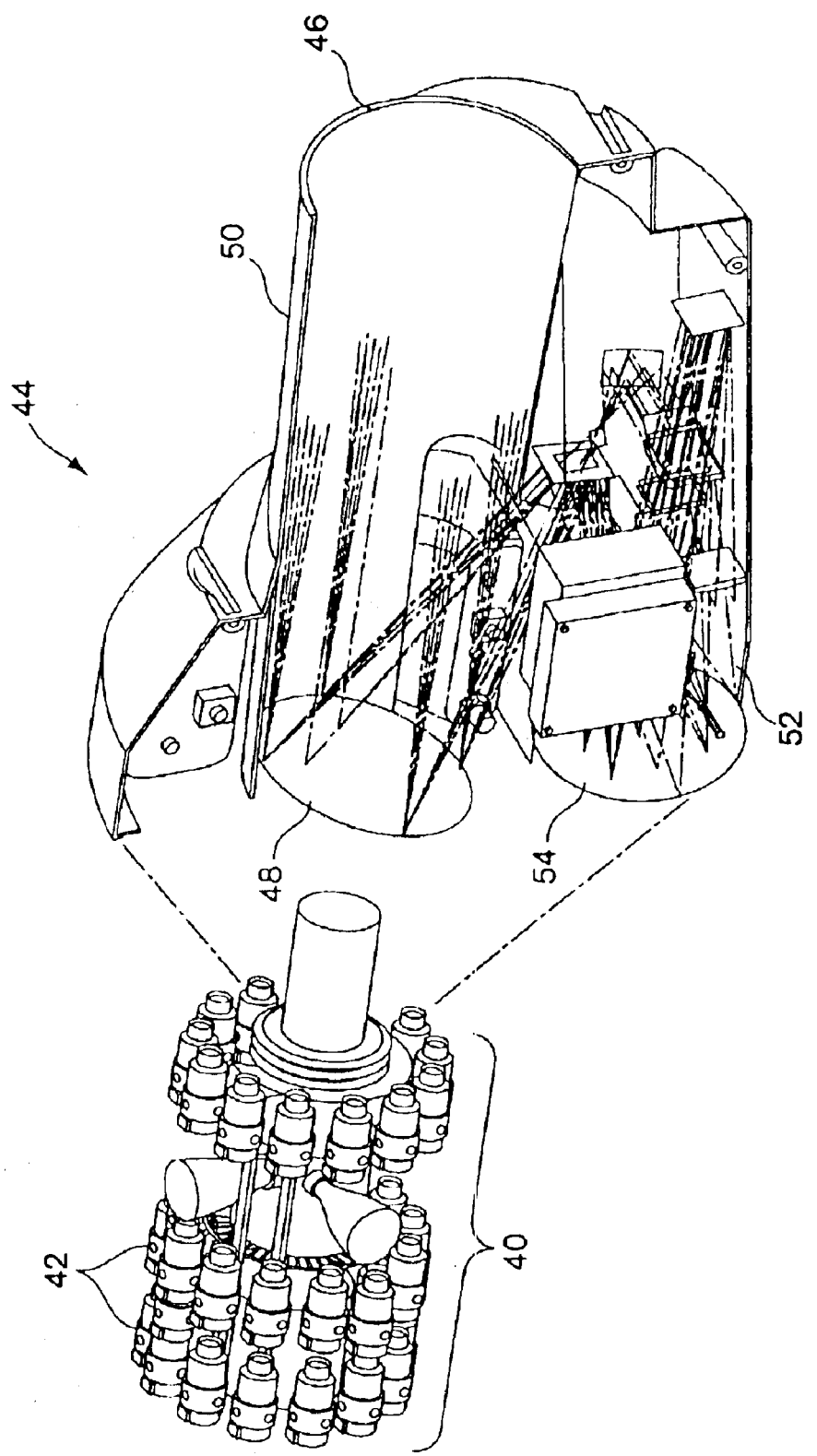
FIG. 8 is a an exploded view of a kill vehicle having multiple individual deployable kill rounds utilizing the dual mode seeker of the present invention.

Referring now to FIG. 8, in an exploded view a module 40 with a number of kill vehicles 42 located about its periphery is provided internally with a seeker pod 44 which has an aperture 46 out of which LADAR pulses emanate and into which reflected LADAR pulses enter, along with received infrared radiation from the target cloud. A reflective lens 48 is utilized to collect the incoming radiation which is split off by a splitter 50 such that the LADAR pulses are both transmitted and received by LADAR unit 52, with radiation going both ways as reflected by reflector 54.

In an alternative embodiment, utilizing a single focal plane array for both IR detection as well as laser detection, the two sensors may be co-boresighted such that the laser range finding pulses are transmitted to the exact point that the IR detector is focused on. This is shown in FIG. 9.

Figure 9:
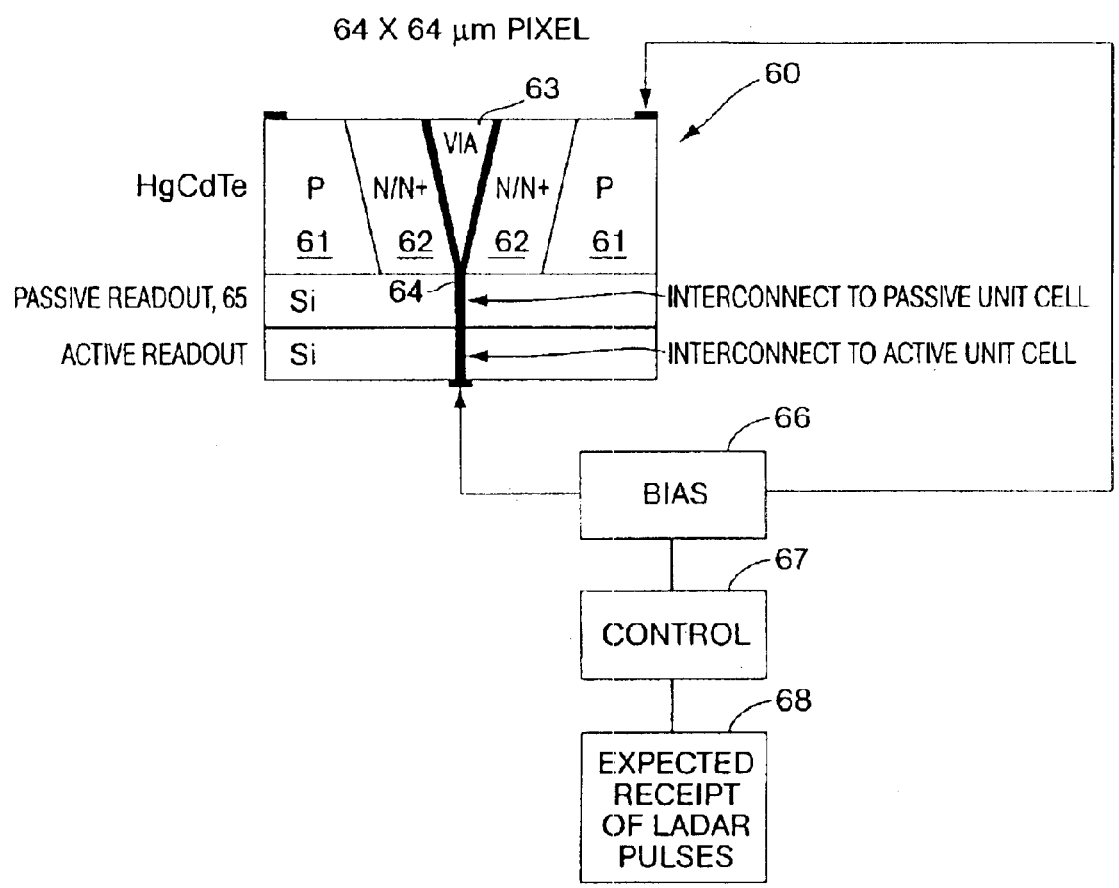
FIG. 9 is a diagrammatic illustration of a co-boresighted focal plane array for detection of both IR and LADAR radiation utilizing one element.

Referring now to FIG. 9, a multi-mode focal plane array element 60 is illustrated as having P sections 61, N/N+ sections 62, a via 63, and interconnect lines 64 for outputting the HgCdTe element to permit a passive readout 65, the purpose of which is to provide an output for the detected IR signal so as to be able to discern or skim off the top portion of the IR signal corresponding to the target signature.

It will be appreciated that the passive readout is turned off or blanked when the gain of the device is increased by a biasing circuit 66 under the control of a control unit 67 which boosts bias upon the expected receipt of LADAR pulses as illustrated at 68.

The active readout is the LADAR readout, with the biasing maintaining the temporal response of the detector in order to be able to look for threshold crossings of the laser pulses.

It is an important part of the subject invention that the gain of the pixel element 60 is increased during those times of expected receipt of LADAR pulses by as much as 30 times the passive mode gain. This means that the same pixel element can be utilized for both IR radiation and LADAR radiation, with the gain providing the cross over between which of the two types of radiation is detected.

The use of a single focal plane device for multi-mode radiation detection even further simplifies the optics such that the IR detector is co-boresighted with the LADAR detector, since the same element is being utilized to detect both.

This means that there are no alignment problems between the IR image and the laser range finder image which is typical of other type of multi-mode systems.

Referring back to FIG. 8, this figure shows the LADAR complete with telescope, laser, IR Dewar and mounting base which also houses the LADAR APD receiver. The laser return is separated from the IR with a high performance dichroic filter. The laser shares the aperture of the IR and LADAR receiver but does not share the remainder of the optics. While not as elegant as the FIG. 9 embodiment, this approach simplifies bore sighting the LADAR with the IR with the minimum number of optical elements, minimum loss in either receive path and greater isolation of the transmitted laser pulse to the laser receiver. An additional significant benefit to this approach is the receive path optics do not have the burden of handling the high energy laser pulse.

Figure 10:
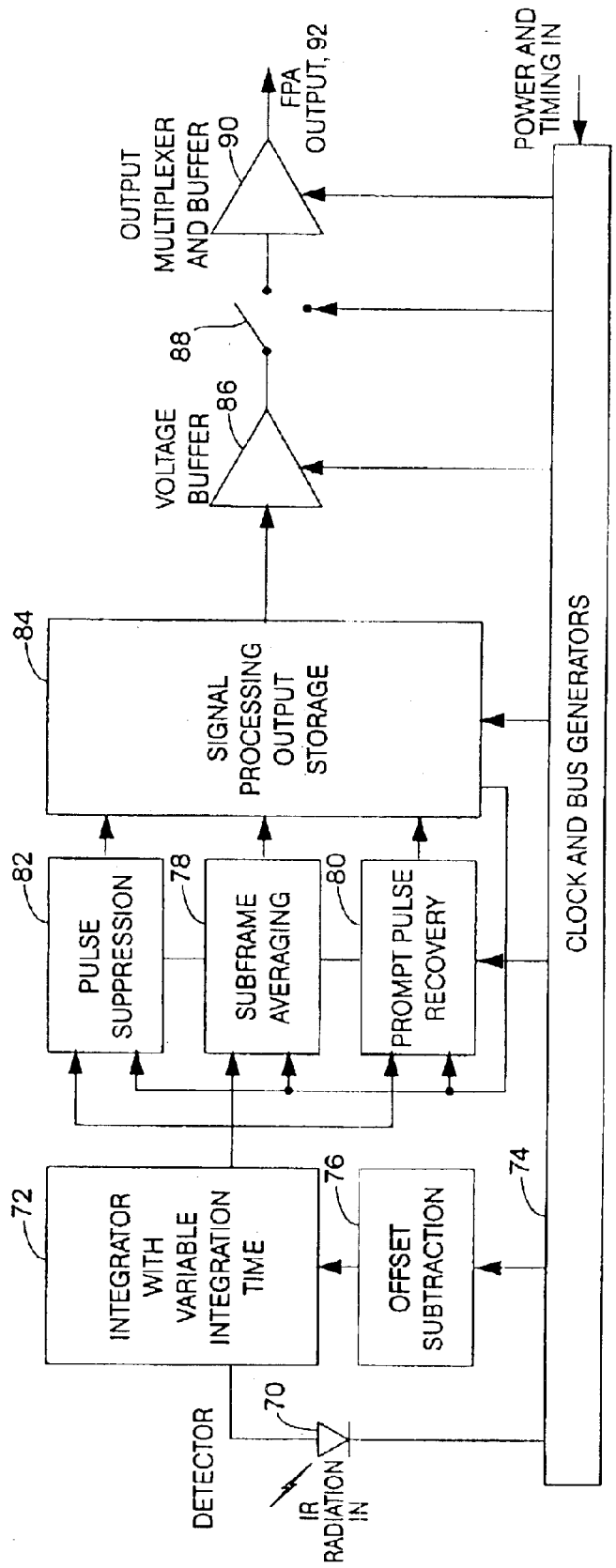
FIG. 10 is a block diagram of an IR detector circuit for use in the seeker of FIG. 8; and, FIG. 11 is a block diagram of a LADAR circuit for use in the seeker of FIG. 8.

Referring now to FIG. 10, in one embodiment, an integrated circuit used to probe the infrared portion of the focal plane array. For each detector 70 an integrator 72 with variable integration times is coupled to the detector and clock and bias generators 74, with an offset subtraction unit 76 being coupled to the integrator. The output of the integrator is applied to a subframe averaging unit 78, a prompt pulse recovery unit 80 and a pulse compression unit 82; all of which are coupled to a signal processing output storage unit 84. The output of the signal processing output storage unit is applied through a voltage buffer 86 and a switch 88 to an output multiplier and buffer 90 which provides the focal plane array output as illustrated at 92.

Figure 11:
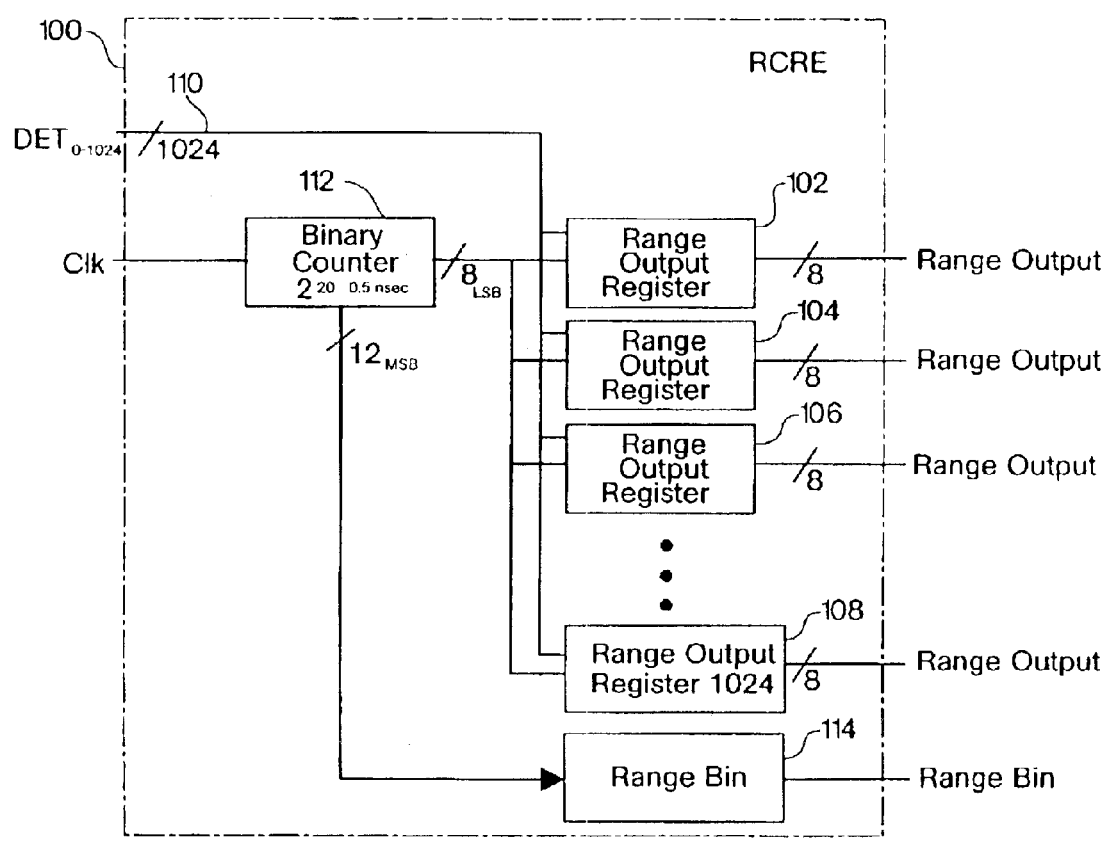

Referring now to the range counting electronics for the LADAR, and to FIG. 11, the output of the detector array here illustrated at 100, is applied to an array of range output registers here illustrated at 102, 104, 106 and 108, with a clock pulse 110 being utilized to clock a binary counter 112, the least significant bits of which are applied to the aforementioned range output registers and the most significant bits applied to a range bin 114. What is provided through the clocking of the range output registers is a plurality of range outputs along with a range bin so that the range to the target can be ascertained.

4.0 Conclusions

Results of a physics based model indicate that sufficient threat/decoy separation is obtained at altitudes in excess of 100 km. Although these separations are small they are within the technology base of current imaging laser radar. Of equal importance is that the selected LADAR technology can be integrated into missile defense seekers. The addition of LADAR to the IR seeker creates a robust solution to discriminations of closely spaced objects but can support and enhance all of the operational requirements from acquisition to intercept.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for detecting the presence and location of a high altitude reentry vehicle in the presence of decoys in which the decoys have associated flight characteristics different from those of the reentry vehicle, comprising the steps of:

detecting by a plurality of radar returns the existence of a number of objects constituting a threat cloud, which are generally on a trajectory towards a point;

launching an intercept vehicle constituting a kill vehicle in the direction of said threat cloud;

determining from the intercept vehicle in a high altitude stripping operation in which characteristics of the objects are measured and analyzed as a result of infrared radiation from the objects a number of atmospheric drag characteristics of the objects lying along the trajectory of the threat cloud;

responsive to the determined characteristics, identifying in the threat cloud the reentry vehicle as opposed to a decoy and the projected track thereof; and, guiding the intercept vehicle to intercept the identified reentry vehicle as it travels along its projected track.

2. The method of claim 1, wherein the trajectory of the threat cloud is first determined by ground-based radar and wherein the stripping operation is made to commence when the intercept vehicle is within a predetermined range of the threat cloud, thus to implement a shoot-look-shoot strategy.

3. The method of claim 1, wherein the determining step includes sensing LADAR and infrared radiation from the threat cloud.

4. The method of claim 3, wherein the step of sensing LADAR and infrared radiation includes utilization of a dual mode LADAR and infrared focal plane array.

5. The method of claim 4, wherein the sensing step includes the use of LADAR and an infrared sensor which are co-boresighted.

6. The method of claim 4, wherein the gain of the focal plane array is increased during the time interval that LADAR returns are expected.

7. A system for detecting presence and track of a reentry vehicle in a threat cloud composed of radar returns from objects occupying a region of space comprising:

a dual mode seeker in an intercept vehicle for detecting infrared and returned laser pulse radiation from objects in said threat cloud;

an algorithm processing unit coupled to detected infrared and returned laser pulse radiation for identifying the types of objects in said threat cloud to identify decoy related flight characteristics thereof, thus to identify a reentry vehicle and its track by classifying the objects in said threat cloud; and, responsive to an identified reentry vehicle, an intercept vehicle controller for guiding said intercept vehicle to intercept the identified reentry vehicle.

8. The system of claim 7, wherein said multimode seeker has a common focal plane array for detecting both infrared and laser radiation.

9. The system of claim 8, wherein the gain of said focal plane array is increased for detecting returned laser pulses.

10. A method of for discrimination between high altitude objects comprising threat objects which are intended to inflict damage and decoy objects, wherein each of said objects has a ballistic coefficient, said method comprising the steps of:

using a dual mode IR and LADAR seeker aboard an intercept vehicle launched toward the objects to obtain precise target dynamic measurements of the objects; and, then using said precise target dynamic measurements and the ballistic coefficient of each of the objects to separate said objects into threat objects and decoy objects.

11. The method of claim 10, wherein the discrimination method is employed at altitudes exceeding 100 km.

* * * * *